US012229230B2

(12) United States Patent
Paxton (10) Patent No.: US 12,229,230 B2
(45) Date of Patent: *Feb. 18, 2025

(54) SECURE TRANSMISSION AND AUTHENTICATION OF A USER CREDENTIAL

(71) Applicant: FMR LLC, Boston, MA (US)

(72) Inventor: Luke Paxton, Sudbury, MA (US)

(73) Assignee: FMR LLC, Boston, MA (US)

( * ) Notice: Subject to any disclaimer, the term of this patent is extended or adjusted under 35 U.S.C. 154(b) by 316 days.

This patent is subject to a terminal disclaimer.

(21) Appl. No.: 17/939,050

(22) Filed: Sep. 7, 2022

(65) Prior Publication Data

US 2023/0283285 A1    Sep. 7, 2023

Related U.S. Application Data

(63) Continuation-in-part of application No. 17/687,549, filed on Mar. 4, 2022, now Pat. No. 11,475,110.

(51) Int. Cl.
  *G06F 21/31*    (2013.01)
  *H03M 1/00*    (2006.01)
(52) U.S. Cl.
  CPC ............ *G06F 21/31* (2013.01); *H03M 1/001* (2013.01)
(58) Field of Classification Search
  CPC ...................................................... G06F 21/31
  See application file for complete search history.

(56) References Cited

U.S. PATENT DOCUMENTS

| | | | |
|---|---|---|---|
| 7,436,316 B2 * | 10/2008 | Fleischman | G06F 21/86 340/556 |
| 7,917,034 B2 | 3/2011 | Yu et al. | |
| 8,281,126 B2 | 10/2012 | Noble et al. | |
| 9,301,141 B1 * | 3/2016 | Mincher | H04L 63/1433 |
| 9,444,547 B2 | 9/2016 | Ganick et al. | |
| 9,823,095 B2 | 11/2017 | Yin et al. | |
| 10,605,653 B1 | 3/2020 | DeWitt, Jr. et al. | |
| 10,630,469 B2 | 4/2020 | Ahn | |
| 10,873,395 B2 | 12/2020 | McLaurin et al. | |
| 12,063,069 B2 * | 8/2024 | Wang | H05B 47/19 |

(Continued)

OTHER PUBLICATIONS

R. Mayrhofer and M. Welch, "A Human-Verifiable Authentication Protocol Using Visible Laser Light," The Second International Conference on Availability, Reliability and Security (ARES'07), 2007, doi: 10.1109/ARES.2007.5, five pages.

*Primary Examiner* — James R Turchen
(74) *Attorney, Agent, or Firm* — Cesari and McKenna, LLP (57) ABSTRACT

Methods and apparatuses are described for secure transmission and authentication of a user credential. A device comprising a memory, a processor, and a laser diode identifies a first user credential comprising a sequence of alphanumeric characters, converts the first user credential into a first plurality of analog signals, and activates the laser diode using the first plurality of analog signals to emit light detectable by a emitted light sensor of a second device. The second device comprising a memory, a processor, and an emitted light sensor generates a second plurality of analog signals corresponding to light emitted by the laser diode and detected by the emitted light sensor, converts the second plurality of analog signals into a second user credential, and authenticates the second user credential.

26 Claims, 5 Drawing Sheets

(56) References Cited

U.S. PATENT DOCUMENTS

| | | | |
|---|---|---|---|
| 2002/0150139 A1* | 10/2002 | Koshimae | H01S 5/06808 |
| | | | 372/75 |
| 2006/0069822 A1* | 3/2006 | Moriwaki | G06F 13/385 |
| | | | 710/71 |
| 2006/0218627 A1* | 9/2006 | Komatsu | G06F 21/43 |
| | | | 726/5 |
| 2014/0093242 A1* | 4/2014 | Lee | H04J 14/02 |
| | | | 398/58 |
| 2014/0208403 A1* | 7/2014 | Lu | H04L 63/0823 |
| | | | 726/6 |
| 2021/0392500 A1* | 12/2021 | Pollington | H04L 63/107 |

* cited by examiner

SECURE TRANSMISSION AND AUTHENTICATION OF A USER CREDENTIAL

RELATED APPLICATIONS

This application is a continuation-in-part of U.S. patent application Ser. No. 17/687,549, filed on Mar. 4, 2022, which is incorporated herein by reference in its entirety.

TECHNICAL FIELD

This application relates generally to methods and apparatuses, including computer program products, for secure transmission and authentication of a user credential

BACKGROUND

Modern computing systems almost always require a user to authenticate to the system prior to allowing access to certain functionality or data. Typically, a user must supply a unique credential (e.g., username and password) to the computing system, which then verifies that the credential is valid. Users often need to satisfy a set of defined criteria (such as length, at least one uppercase and/or lowercase characters, at least one number and/or special character, etc.) when setting up a user credential, e.g., to meet a minimum level of security required by the computing system.

In many cases, such user credentials are cumbersome for users to create and/or remember in the future. Users must frequently supply their user credentials to the computing system in a manner where they may be seen by bad actors. Furthermore, transmitting encrypted or unencrypted user credentials to remote authentication systems for verification uses communication networks that can be compromised or eavesdropped in order for others to intercept and misappropriate the user credentials. Also, some systems require users to provide not only user credentials, but also satisfy requirements of existing user verification or challenge-response services, such as CAPTCHA (www.captcha.net) or reCAPTCHA (google.com/recaptcha/about). However, the use of such challenge-response services adds another layer of complexity to the authentication process, and can be limiting to certain individuals that depend on screen or assistive devices.

SUMMARY

Therefore, what is needed are methods, devices, and systems for secure transmission and authentication of a user credential via the generation of analog signals transmitted using colored light pulses from a laser diode and detected by a corresponding sensor device. The techniques described herein advantageously provide for user credential creation and transmission using analog signals that are difficult to reproduce and are not susceptible to interception via a communications network. In preferred embodiments, the laser diode and sensor device are encapsulated within an opaque housing that prevents visual observation of the laser transmission (thereby providing further security) and also shielding the sensor device from atmospheric light to provide for improved pulse transmission. Furthermore, the methods and systems described herein beneficially allow users to provide credentials for access to computing systems and functionality without the need to create, remember, or repeatedly enter specific credentials moving forward.

The invention, in one aspect, features a system for secure transmission and authentication of a user credential. The system comprises a first computing device comprising a memory, a processor, and a laser diode. The system further comprises a second computing device comprising a memory, a processor, and a sensor for detecting emitted light. The first computing device identifies a first user credential comprising a sequence of alphanumeric characters, converts the first user credential into a first plurality of analog signals, and activates the laser diode using the first plurality of analog signals to emit light detectable by the sensor of the second computing device. The second computing device generates a second plurality of analog signals corresponding to light emitted by the laser diode and detected by the sensor, converts the second plurality of analog signals into a second user credential, and authenticates the second user credential.

The invention, in another aspect, features a computerized method of secure transmission and authentication of a user credential. A first computing device comprising a memory, a processor, and a laser diode identifies a first user credential comprising a sequence of alphanumeric characters, converts the first user credential into a first plurality of analog signals, and activates the laser diode using the first plurality of analog signals to emit light detectable by the sensor of the second computing device. A second computing device comprising a memory, a processor, and a sensor for detecting emitted light generates a second plurality of analog signals corresponding to light emitted by the laser diode and detected by the sensor, converts the second plurality of analog signals into a second user credential, and authenticates the second user credential.

Any of the above aspects can include one or more of the following features. In some embodiments, converting the user credential into a first plurality of analog signals comprises generating an analog signal for activating the laser diode for each character in the sequence of characters, and transmitting the generated analog signals to the laser diode. In some embodiments, the analog signals for activating the laser diode each comprises a color value and an intensity value. In some embodiments, activating the laser diode using the first plurality of analog signals to transmit light to the sensor of the second computing device comprises emitting, by the laser diode, one or more light pulses corresponding to each analog signal in the first plurality of signals, wherein the one or more light pulses have a color corresponding to the color value of the analog signal and an intensity corresponding to the intensity value of the analog signal.

In some embodiments, the laser diode stops emitting light for a predetermined amount of time between each generation of one or more light pulses corresponding to the first plurality of analog signals. In some embodiments, the laser diode stops emitting light after all of the light pulses corresponding to the analog signals in the first plurality of signals have been emitted.

In some embodiments, generating a second plurality of analog signals corresponding to light emitted from the laser diode and detected by the sensor comprises detecting, by the sensor, light emitted by the laser diode at each of a plurality of intervals, converting the light detected at each interval into a color value of the light and an intensity value of the light, and generating an analog signal corresponding to the color value and the intensity value of the light detected at each interval. In some embodiments, converting the second plurality of analog signals into a second user credential comprises identifying an alphanumeric character based upon the analog signal generated for each interval, and generating the second user credential based upon the alphanumeric characters. In some embodiments, authenticating the second user credential comprises encrypting the second user credential and transmitting the encrypted second user credential to a remote computing device for authentication.

In some embodiments, the first user credential is encrypted prior to being converted into the first plurality of analog signals. In some embodiments, the first user credential is stored in the memory of the first computing device. In some embodiments, the first computing device comprises a user input mechanism that, when activated, initiates the identification of the first user credential. In some embodiments, the sensor comprises a solar panel.

The invention, in another aspect, features a system for secure transmission and authentication of a user credential. The system comprises a first computing device comprising a memory and a processor, the first computing device coupled to a laser diode and a first ambient light sensor within an enclosure. The system comprises a second computing device comprising a memory and a processor, the second computing device coupled to an emitted light sensor and a second ambient light sensor within the enclosure. The first computing device measures, using the first ambient light sensor, a first illuminance value of ambient light in the enclosure. The first computing device converts a first user credential comprising a sequence of alphanumeric characters and the first illuminance value into a first plurality of analog signals. The first computing device activates the laser diode using the first plurality of analog signals to emit light detectable by the emitted light sensor. The second computing device generates a second plurality of analog signals corresponding to light emitted by the laser diode and detected by the emitted light sensor. The second computing device converts a first portion of the second plurality of analog signals into a second user credential, and authenticates the second user credential. The second computing device converts a second portion of the second plurality of analog signals into the first illuminance value. The second computing device measures, using the second ambient light sensor, a second illuminance value of ambient light in the enclosure. The second computing device compares the first illuminance value and the second illuminance value to determine whether the illuminance values match.

The invention, in another aspect, features a computerized method of secure transmission and authentication of a user credential. A first computing device comprising a memory and a processor, and coupled to a laser diode and a first ambient light sensor within an enclosure, measures using the first ambient light sensor a first illuminance value of ambient light in the enclosure. The first computing device converts a first user credential comprising a sequence of alphanumeric characters and the first illuminance value into a first plurality of analog signals. The first computing device activates the laser diode using the first plurality of analog signals to emit light detectable by the emitted light sensor. A second computing device comprising a memory and a processor, and coupled to an emitted light sensor and a second ambient light sensor within the enclosure, generates a second plurality of analog signals corresponding to light emitted by the laser diode and detected by the emitted light sensor. The second computing device converts a first portion of the second plurality of analog signals into a second user credential, and authenticates the second user credential. The second computing device converts a second portion of the second plurality of analog signals into the first illuminance value. The second computing device measures, using the second ambient light sensor, a second illuminance value of ambient light in the enclosure. The second computing device compares the first illuminance value and the second illuminance value to determine whether the illuminance values match.

Any of the above aspects can include one or more of the following features. In some embodiments, converting the user credential into a first plurality of analog signals comprises: generating an analog signal for activating the laser diode for each character in the sequence of characters; generating an analog signal for activating the laser diode for the first illuminance value; and transmitting the generated analog signals to the laser diode. In some embodiments, the analog signals for activating the laser diode each comprises a color value and an intensity value. In some embodiments, activating the laser diode using the first plurality of analog signals to transmit light to the emitted light sensor comprises emitting, by the laser diode, one or more light pulses corresponding to each analog signal in the first plurality of signals, wherein the one or more light pulses have a color corresponding to the color value of the analog signal and an intensity corresponding to the intensity value of the analog signal. In some embodiments, the laser diode stops emitting light for a predetermined amount of time between each generation of one or more light pulses corresponding to the first plurality of analog signals. In some embodiments, the laser diode stops emitting light after all of the light pulses corresponding to the analog signals in the first plurality of signals have been emitted.

In some embodiments, generating a second plurality of analog signals corresponding to light emitted from the laser diode and detected by the emitted light sensor comprises: detecting, by the emitted light sensor, light emitted by the laser diode at each of a plurality of intervals; converting the light detected at each interval into a color value of the light and an intensity value of the light; and generating the first portion of the second plurality of analog signals and the second portion of the second plurality of analog signals based upon the color value and the intensity value of the light detected at each interval. In some embodiments, converting the first portion of the second plurality of analog signals into a second user credential comprises: identifying an alphanumeric character based upon the analog signal generated for each interval in the first portion of the second plurality of analog signals; and generating the second user credential based upon the alphanumeric characters. In some embodiments, authenticating the second user credential comprises encrypting the second user credential and transmitting the encrypted second user credential to a remote computing device for authentication.

In some embodiments, the first user credential is encrypted prior to being converted into the first plurality of analog signals. In some embodiments, the first ambient light sensor and the second ambient light sensor each comprises a photodiode. In some embodiments, the second computing device initiates a transaction with a remote computing device when the first illuminance value matches the second illuminance value. In some embodiments, the second computing device prevents initiation of a transaction with a remote computing device when the first illuminance value does not match the second illuminance value.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
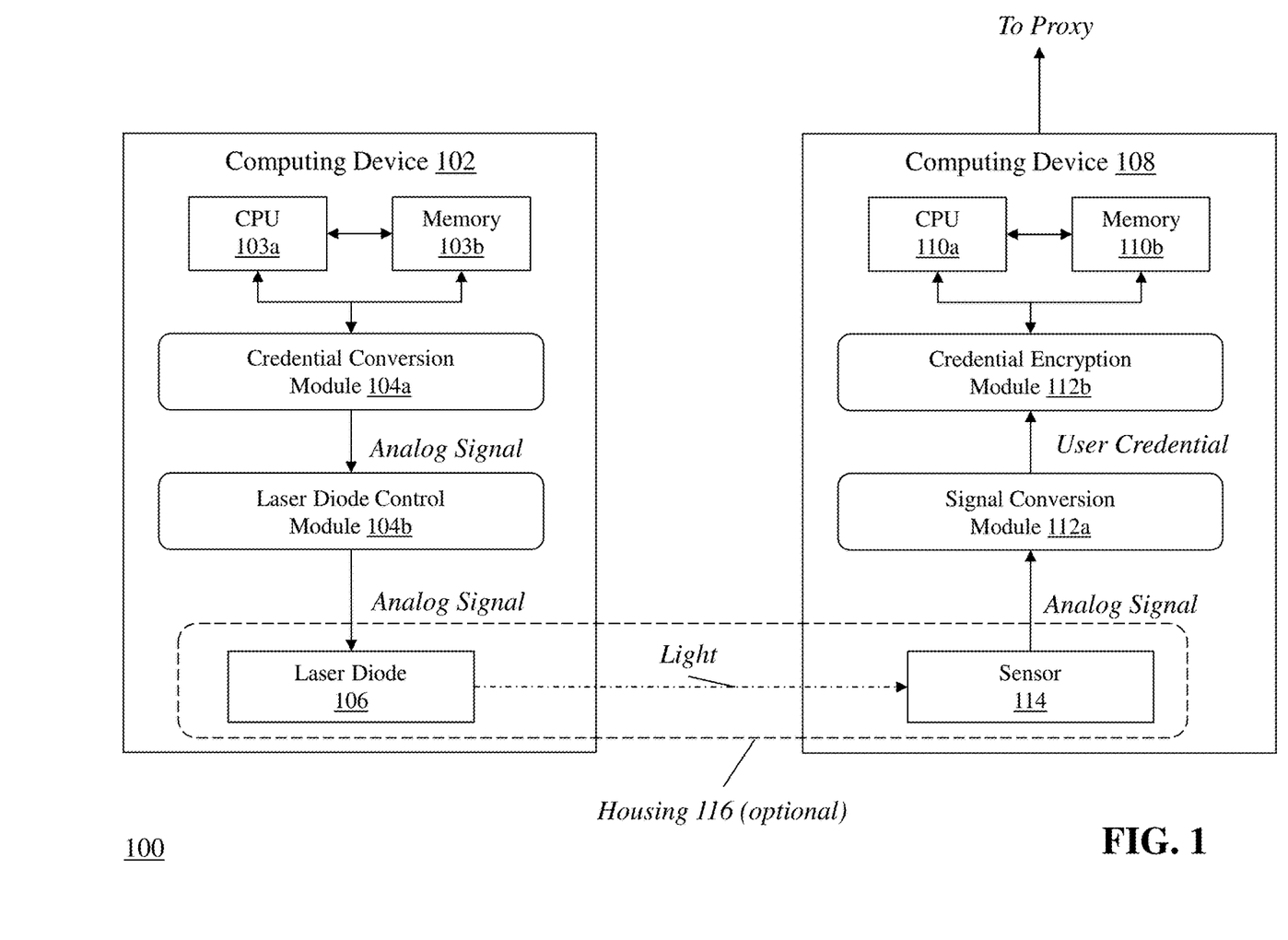
FIG. 1 is a block diagram of a first illustrative embodiment of a system for secure transmission and authentication of a user credential.

FIG. 1 is a block diagram of a system 100 for secure transmission and authentication of a user credential. The system 100 includes a first computing device 102 comprising a CPU 103a, a memory 103b, a credential conversion module 104a, a laser diode control module 104b, and a laser diode 106. The system 100 also includes a second computing device 108 comprising a CPU 110a, a memory 110b, a signal conversion module 112a, a credential encryption module 112b, and a sensor 114 for detecting emitted light. In some embodiments, the system 100 includes a housing 116 (e.g., made of an opaque material) that encloses the laser diode 106 and the sensor 114 to prevent visual observation of the laser pulses and to eliminate atmospheric light from interfering with or degrading the laser pulses.

The first computing device 102 and the second computing device 108 are hardware devices including specialized components and software modules that execute on a processor 103a, 110a respectively and interact with memory modules 103b, 110b of the respective computing device 102, 108, to receive data from other components of the system 100, transmit data to other components of the system 100, and perform functions for secure transmission and authentication of a user credential as described herein. As mentioned above, computing device 102 includes a credential conversion module 104a and a laser diode control module 104b that execute on the processor 103a of computing device 102, and computing device 108 includes a signal conversion module 112a and a credential encryption module 112b that execute on the processor 110a of computing device 108. In some embodiments, the modules 104a, 104b, 112a, 112b are specialized sets of computer software instructions programmed onto one or more dedicated processors (e.g., processor 103a or processor 110a) in the respective computing devices 102, 108 and in some embodiments the modules 104a, 104b, 112a, 112b include specifically-designated memory locations and/or registers for executing the specialized computer software instructions.

Although the computing modules 104a, 104b are shown in FIG. 1 as executing within the same computing device 102, and the computing modules 112a, 112b are shown as executing within the same computing device 108, in some embodiments the functionality of the modules 104a, 104b, 112a, and/or 112b can be distributed among a plurality of computing devices. As shown in FIG. 1, computing device 102 enables the modules 104a, 104b to communicate with each other, and with laser diode 106, in order to exchange data for the purpose of performing the described functions. Similarly, computing device 108 enables the modules 112a, 112b to communicate with each other, and with sensor 114, in order to exchange data for the purpose of performing the described functions. The exemplary functionality of the modules 104a, 104b, 112a, and 112b is described in detail below.

The laser diode 106 is a hardware component of computing device 102 that is configured to receive instructions from laser diode control module 104b and generate and emit light signals based upon the instructions. In some embodiments (as shown in FIG. 1), the laser diode 106 can be integrated with the computing device 102. In some embodiments, the laser diode 106 can be a standalone device that is physically coupled to computing device 102. It should be appreciated that in some embodiments, the laser diode 106 comprises a plurality of individual laser diodes, where each individual diode comprises a different color (e.g., red, green, blue, etc.). In some embodiments, the laser diode 106 comprises a Class 2 laser, with an output wavelength of 532 nm+/−10, max output of <5 mW.

The sensor 114 is a hardware component of computing device 108 that is configured to detect light signals emitted by laser diode 106 of computing device 102 and convert the light signals into analog signals, which are then transmitted to signal conversion module 112a. An exemplary sensor 114 that can be used in the system 100 is a solar panel. An exemplary solar panel is a model SC10050, 5.0 V, 100 mA solar cell available from Leo Sales Ltd. of Richmond, British Columbia, Canada.

Figure 2:
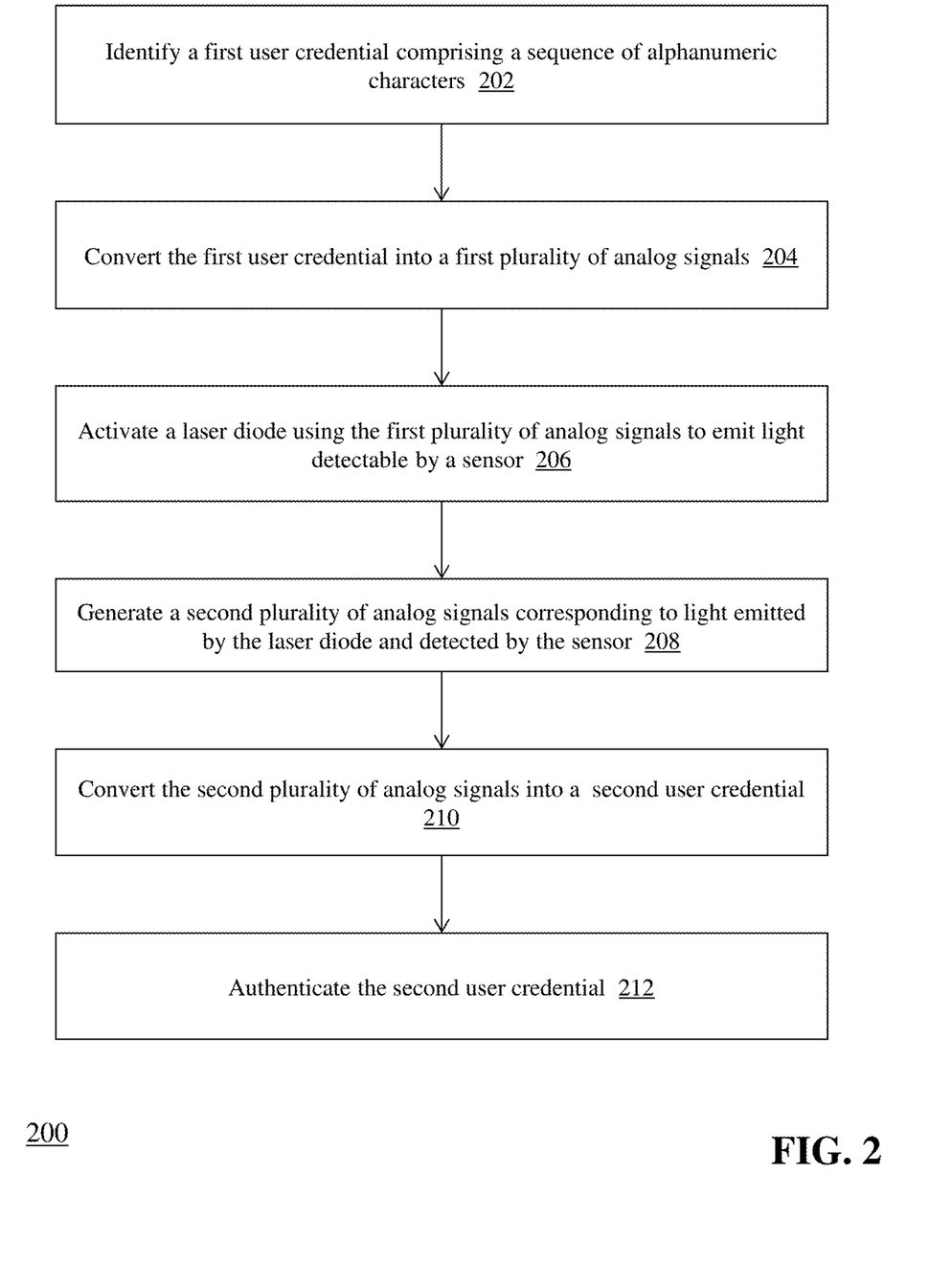
FIG. 2 is a flow diagram of a computerized method of secure transmission and authentication of a user credential.

FIG. 2 is a flow diagram of a computerized method 200 of secure transmission and authentication of a user credential, using the system 100 of FIG. 1. The first computing device 102 identifies (step 202) a first user credential comprising a sequence of alphanumeric characters. In some embodiments, memory 103b stores the first user credential (e.g., password, authorization code, etc.) and processor 103a retrieves the first user credential from memory 103b. In some embodiments, computing device 102 receives the first user credential from another computing device (e.g., a personal computer) coupled to computing device 102. For example, a user can provide a user credential as input to computing device 102 and/or another computing device by, e.g., typing in the user credential, or pushing a button on computing device 102 to retrieve the first user credential from memory 103b. Generally, the first user credential comprises a sequence of alphanumeric characters that can be used to uniquely identify a user of computing device 102. It should be appreciated that the first user credential can comprise another type of authentication mechanism—such as biometric information, tokens (e.g., one-time password), device identifiers, and the like—and/or the first user credential can comprise multiple different authentication mechanisms in a multi-factor authentication paradigm.

To provide for increased security, in some embodiments the first user credential can be encrypted either after computing device 102 identifies the user credential and/or upon receipt of the user credential by computing device 102. For example, processor 103a of computing device 102 can encrypt the first user credential using one or more cryptographic algorithms or techniques (e.g., hashing) to generate an encrypted version of the credential before the credential is converted to analog signals as described below.

After the first user credential is identified, credential conversion module 104a of computing device 102 converts (step 204) the first user credential into a plurality of analog signals. In some embodiments, credential conversion module 104a generates an analog signal for each character in the sequence of alphanumeric characters that make up the first user credential, which is then used to activate the laser diode 106. Credential conversion module 104a extracts each character from the sequence of alphanumeric characters (either encrypted or unencrypted) and converts the character to an analog signal that corresponds to a color value and an intensity value of light to be emitted by the laser diode 106. For example, credential conversion module 104a can determine a certain light color and intensity value that is assigned to a particular character (e.g., lowercase letter, uppercase letter, number, etc.) and instruct the laser diode control module 104b to generate an analog wave signal based upon the light color and intensity value. The laser diode control module 104b transmits the analog wave signal to the laser diode 106, which produces one or more pulses of laser light in a color and intensity that correspond to the analog wave signal for the character. As can be appreciated, the laser diode 106 can comprise a laser diode driver that provides current to the laser diode based upon the analog wave signal (e.g., a sine wave, triangle wave scan, or square wave) received from the laser diode control module 104b.

In some embodiments, the laser diode 106 can comprise a tri-color laser light source (red (R), green (G), blue (B)) that can be activated to generate a wide spectrum of colors and light intensities. As an illustrative example, the laser diode control module 104b can be configured to generate an uppercase letter and a lowercase letter for each light color, in total that would be fifty-two letters for each light (i.e., laser diode). In combination with the three different color lights, there are 156 elements that can be encoded and transmitted by the laser diode 106, that is, R-Uppercase, R-Lowercase, G-Uppercase, G-Lowercase, B-Uppercase, B-Lowercase. It should be appreciated that the laser diode 106 can be configured to produce any of a number of different colors of light, including but not limited to red, red-orange, orange, yellow, green, greenish-blue, blue, violet, and/or combinations of the same. Also, in combination with color, the laser diode 106 can be configured to emit varying pulses and/or intensities of light in order to convey certain characters to the sensor 114.

Once the analog signals for the user credential are generated by the credential conversion module 104a, laser diode control module 104b activates (step 206) the laser diode 106 using the generated analog signals to emit light detectable by the sensor 114 that is coupled to second computing device 108. In some embodiments, the laser diode control module 104b can activate the laser diode 106 using the analog signal for each character and include a delay (e.g., 10 ms) in between activation of the laser diode for respective characters, so that there is a small period of time where the laser diode 106 is not emitting any light that is detectable by the sensor 114. In this way, the sensor 114 can advantageously capture the light associated with each character separately for processing. In addition, the laser diode control module 104b can include a longer delay (e.g., 1000 ms) after the laser diode 106 emits light corresponding to the final character in the user credential, which indicates to the sensor that the user credential transmission is complete.

It should be appreciated that by having alphanumeric characters of the user credential stored in wave signal form, the laser diode control module 104b can advantageously add randomness to the plurality of analog signals being delivered to the second computing device 108 by, e.g., adjusting voltage to the laser diode 106. For example, when the laser diode 106 includes a red laser diode and the laser diode control module 104b activates the red laser diode with 5 v, the wave signal might read, the wave signal might read 400.000001<=499.9999999. Whereas, if the laser diode control module 104b activates the red laser diode with 3 v, the wave signal might read 200.000001<=299.9999999. Also, any laser diodes of other colors can be increased or decreased by the same value so there would not be overlap in the output range of a given laser diode.

For each emission of light by the laser diode 106, sensor 114 coupled to second computing device 108 detects the emitted light pulses (e.g., by capturing the wavelength and intensity of the light) for each character and transmits the detected light pulse (as an analog signal) to signal conversion module 112a. Signal conversion module 112a generates (step 208) a second plurality of analog signals corresponding to the light detected by the sensor 114. In some embodiments, signal conversion module 112a receives the analog signal from the sensor 114 and converts the analog signal into a color value of the light and an intensity value of the light. For example, when the analog signal detected by the sensor 114 falls between a certain range or set of threshold values, signal conversion module 112a can be configured to interpret the signal as a particular alphanumeric character. For each different emitted light pulse detected by the sensor 114, signal conversion module 112a converts (step 210) the corresponding analog signal received from the sensor 114 into an alphanumeric character that is appended to a second user credential. In some embodiments, the second user credential generated by signal conversion module 112a corresponds to the encrypted or unencrypted first user credential at first computing device 102. In other embodiments, the second user credential can be different than the first user credential (e.g., characters in a different order or an entirely new credential, based upon the laser light received at the sensor 114). Signal conversion module 112a transmits the generated second user credential to credential encryption module 112b.

Credential encryption module 112b can encrypt the second user credential (e.g., using any of a number of different encryption algorithms or techniques). Also, in some embodiments, credential encryption module 112b authenticates (step 212) the second user credential—while in other embodiments, credential encryption module 112b transmits the encrypted or unencrypted second user credential to a proxy device (not shown) such as a web server or other computing device that performs authentication of the second user credential.

Figure 3:
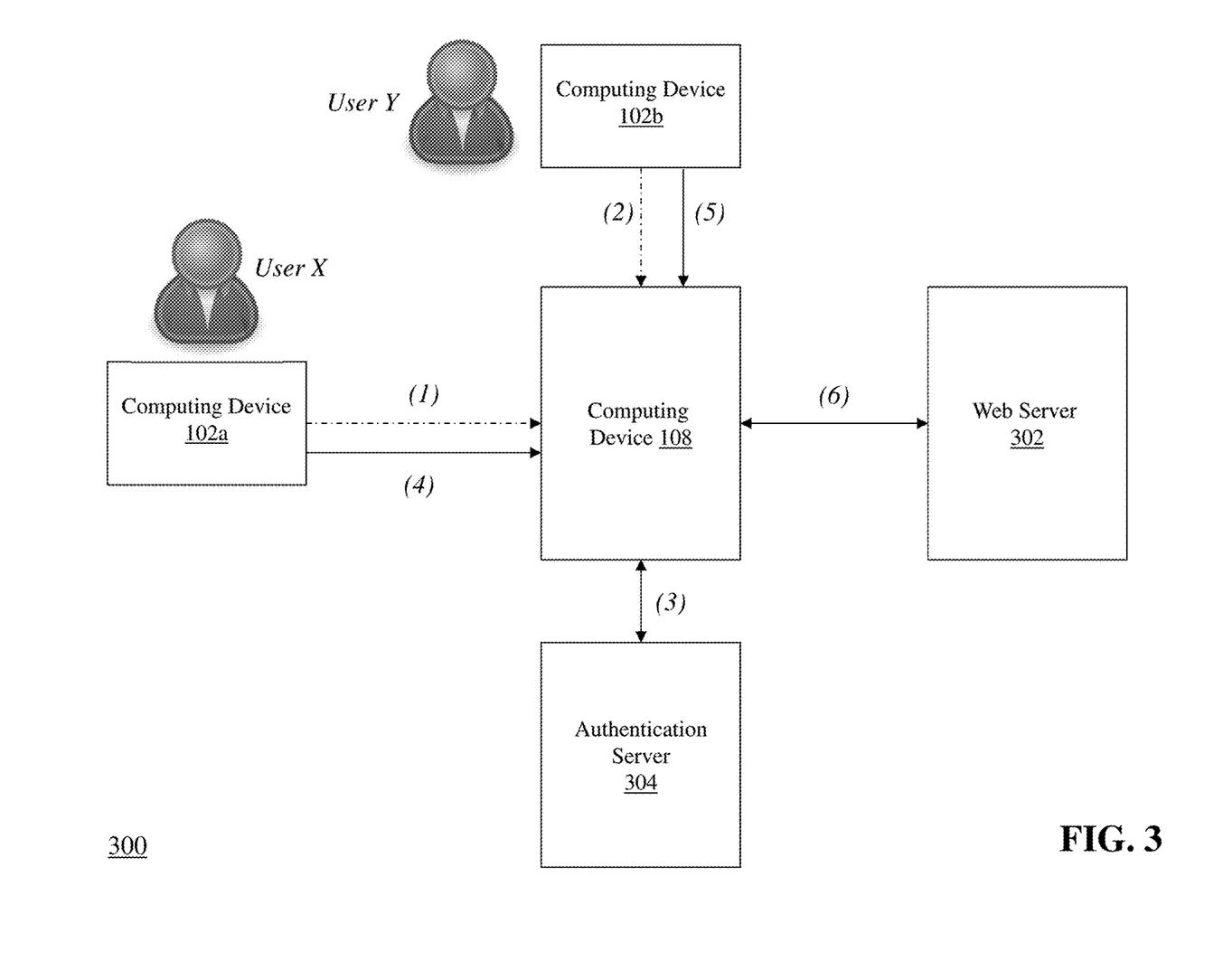
FIG. 3 is a flow diagram of a computerized method for user credential authentication in a web application computing environment, using the system of FIG. 1.

An exemplary use case for the user credential authentication techniques described herein is provided below. FIG. 3 is a flow diagram of a computerized method for user credential authentication in a web application computing environment, using the system 100 of FIG. 1. As shown in FIG. 3, computing device 102a can be a client computing device of a system administrator that needs to manage user accounts and permissions associated with the web server 302. Computing device 102b can be a client computing device of a customer that wants to log into the web server 302 in order to view his or her accounts and execute one or more transactions. Although not shown in FIG. 3, it should be appreciated that each of computing device 102a and 102b includes the components 103a, 103b, 104a, 104b, and 106 of computing device 102 of FIG. 1. Computing device 108 can be a computing device that acts as an intermediary between client computing devices 102a, 102b and web server 302/authentication server 304. Although not shown in FIG. 3, it should be appreciated that computing device 108 includes the components 110a, 110b, 112a, 112b, and 114 of computing device 108 of FIG. 1. Web server 302 can be a server computing device that provides application functionality to the computing devices 102a, 102b via computing device 108. Authentication server 304 can be a server computing device that receives authentication requests (including user credentials) from computing device 108 and validates the credentials to enable client devices 102a, 102b to access web server 302.

At step (1), User X interacts with computing device 102a to transmit a user credential to computing device 108 using the laser diode of device 102a (as described above). The sensor of computing device 108 receives the light pulses from the laser diode and converts the pulses into a user credential for User X. Similarly, at step (2) User Y interacts with computing device 102b to transmit a user credential to computing device 108 using the laser diode of device 102b, and the sensor of computing device receives the light pulses from the laser diode and converts them into a user credential for User Y. At step (3), computing device 108 transmits the user credential for User X and the user credential for User Y to authentication server 304, which confirms that the user credentials are valid and that the users are authorized to access web server 302. As can be appreciated, in some embodiments authentication server 304 determines one or more roles and/or permissions for each of User X and User Y according to, e.g., one or more user profiles associated with the user credentials and enables access to web server 302 based upon the roles and/or permissions.

Upon validating the user credentials, computing device 108 can transmit a response to the respective authentication requests to computing device 102a and computing device 102b. At step (4), computing device 102a generates and transmits a request to access web server 302 (e.g., via a network connection). Similarly, at step (5) computing device 102b generates and transmits a request to access web server 302. Computing device 108 receives the access requests from computing device 102a and 102b, and transmits the requests to web server 302—at which point a communication session is established between the respective computing devices 102a, 102b and web server 302. It should be appreciated that in some embodiments, the access requests of steps (4) and (5) can be transmitted directly to web server 302 once authentication is complete.

Figure 4:
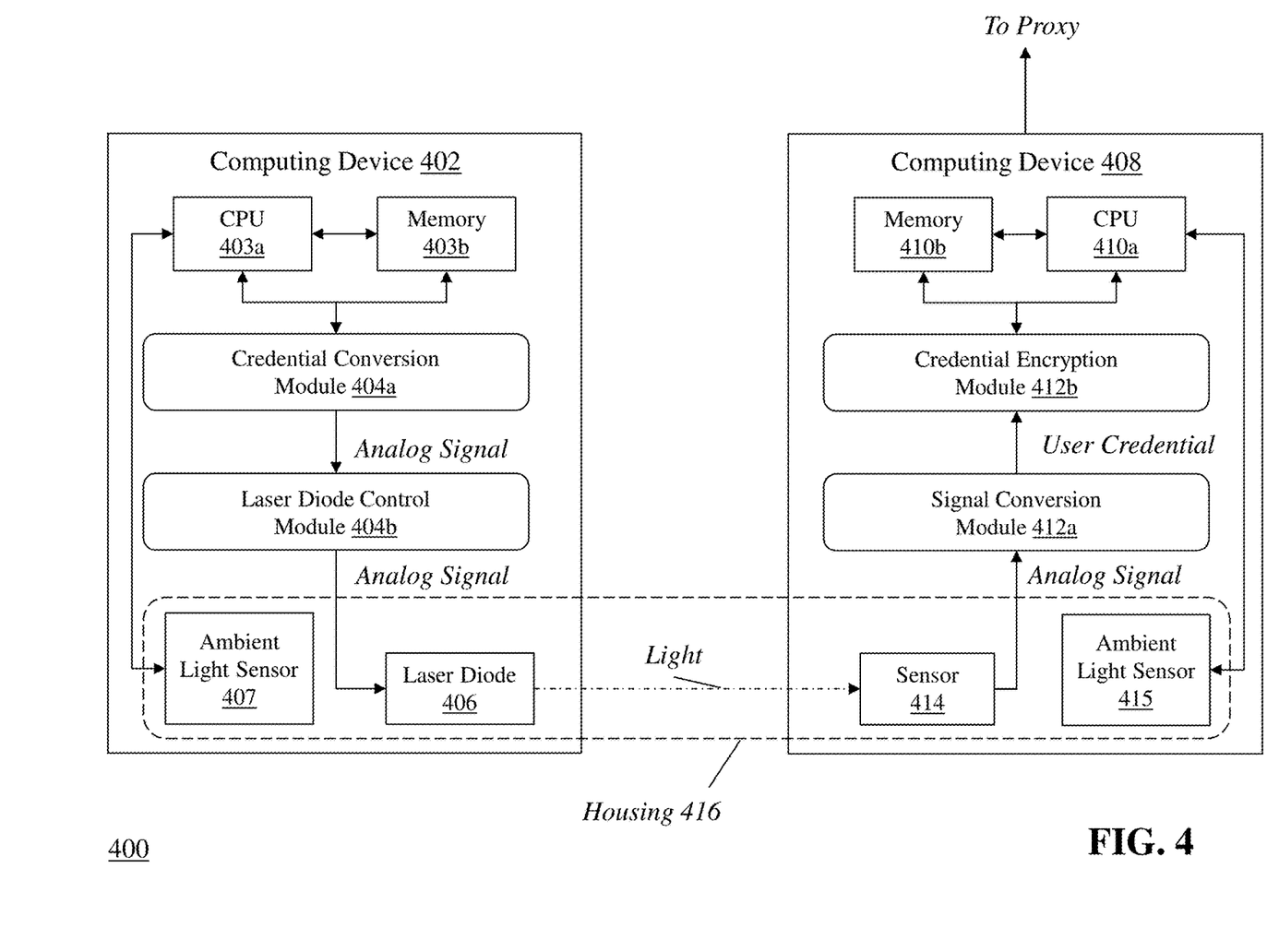
FIG. 4 is a block diagram of a second illustrative embodiment of a system for secure transmission and authentication of a user credential.

FIG. 4 is a block diagram of a second illustrative embodiment of a system 400 for secure transmission and authentication of a user credential. System 400 includes a first computing device 402 comprising a CPU 403a, a memory 403b, a credential conversion module 404a, a laser diode control module 404b, a laser diode 406, and an ambient light sensor 407. System 400 also includes a second computing device 408 comprising a CPU 410a, a memory 410b, a signal conversion module 412a, a credential encryption module 412b, a sensor 414 for detecting emitted light, and an ambient light sensor 415. In some embodiments, system 400 includes a housing 416 (e.g., made of an opaque material) that encloses the laser diode 406, the ambient light sensor 407, the emitted light sensor 414 and the ambient light sensor 415 to prevent visual observation of the laser pulses and to eliminate atmospheric light from interfering with or degrading the laser pulses.

The first computing device 402 and the second computing device 408 are hardware devices including specialized components and software modules that execute on a processor 403a, 410a respectively and interact with memory modules 403b, 410b of the respective computing device 402, 408, to receive data from other components of the system 400, transmit data to other components of the system 400, and perform functions for secure transmission and authentication of a user credential as described herein. As mentioned above, computing device 402 includes a credential conversion module 404a and a laser diode control module 404b that execute on the processor 403a of computing device 402, and computing device 408 includes a signal conversion module 412a and a credential encryption module 412b that execute on the processor 1410a of computing device 408. In some embodiments, the modules 404a, 404b, 412a, 412b are specialized sets of computer software instructions programmed onto one or more dedicated processors (e.g., processor 403a or processor 410a) in the respective computing devices 102, 108 and in some embodiments the modules 404a, 404b, 412a, 412b include specifically-designated memory locations and/or registers for executing the specialized computer software instructions.

Although the computing modules 404a, 404b are shown in FIG. 4 as executing within the same computing device 402, and the computing modules 412a, 412b are shown as executing within the same computing device 408, in some embodiments the functionality of the modules 404a, 404b, 412a, and/or 412b can be distributed among a plurality of computing devices. As shown in FIG. 4, computing device 402 enables the modules 404a, 404b to communicate with each other, and with laser diode 406, in order to exchange data for the purpose of performing the described functions. Similarly, computing device 408 enables the modules 412a, 412b to communicate with each other, and with emitted light sensor 414, in order to exchange data for the purpose of performing the described functions. The exemplary functionality of the modules 404a, 404b, 412a, and 412b is described in detail below.

The laser diode 406 is a hardware component of computing device 402 that is configured to receive instructions from laser diode control module 404b and generate and emit light signals based upon the instructions. In some embodiments (as shown in FIG. 4), the laser diode 406 can be integrated with the computing device 402. In some embodiments, the laser diode 406 can be a standalone device that is physically coupled to computing device 402. It should be appreciated that in some embodiments, the laser diode 406 comprises a plurality of individual laser diodes, where each individual diode comprises a different color (e.g., red, green, blue, etc.). In some embodiments, the laser diode 406 comprises a Class 2 laser, with an output wavelength of 532 nm+/−10, max output of <5 mW.

The emitted light sensor 414 is a hardware component of computing device 408 that is configured to detect light signals emitted by laser diode 406 of computing device 102 and convert the light signals into analog signals, which are then transmitted to signal conversion module 412a. An exemplary sensor 414 that can be used in the system 400 is a solar panel. An exemplary solar panel is a model SC10050, 5.0 V, 100 mA solar cell available from Leo Sales Ltd. of Richmond, British Columbia, Canada.

The ambient light sensors 407, 415 are hardware components coupled to CPUs 403a, 410a respectively that are configured to sense an illuminance value of ambient light in housing 416 during one or more time periods when laser diode 406 is not actively transmitting light that is detected by sensor 414. In some embodiments, each ambient light sensor 407, 415 comprises a photodiode for capturing and measuring the ambient light. Other embodiments may include a phototransistor or other type of sensing device packaging. In one example, one or more of the ambient light sensors 407, 415 can detect ambient light in housing 416 prior to activation of laser diode 406 and/or after laser diode 406 has completed transmission of light to sensor 414. The ambient light sensors 407, 415 can transmit a detected illuminance value to CPUs 403a, 410a respectively and the detected illuminance values can be used as part of an additional level of security validation for system 400 as will be described in detail below. An exemplary ambient light sensor 407, 415 that can be used in system 400 is a VEML7700 Lux Sensor, available from Adafruit Industries of New York, New York. The exemplary ambient light sensor has 16-bit dynamic range for ambient light detection from 0 lux (lumens per square meter) to about 120 klux with resolution down to 0.0036 lx/ct, with software-adjustable gain and integration times.

Figure 5:
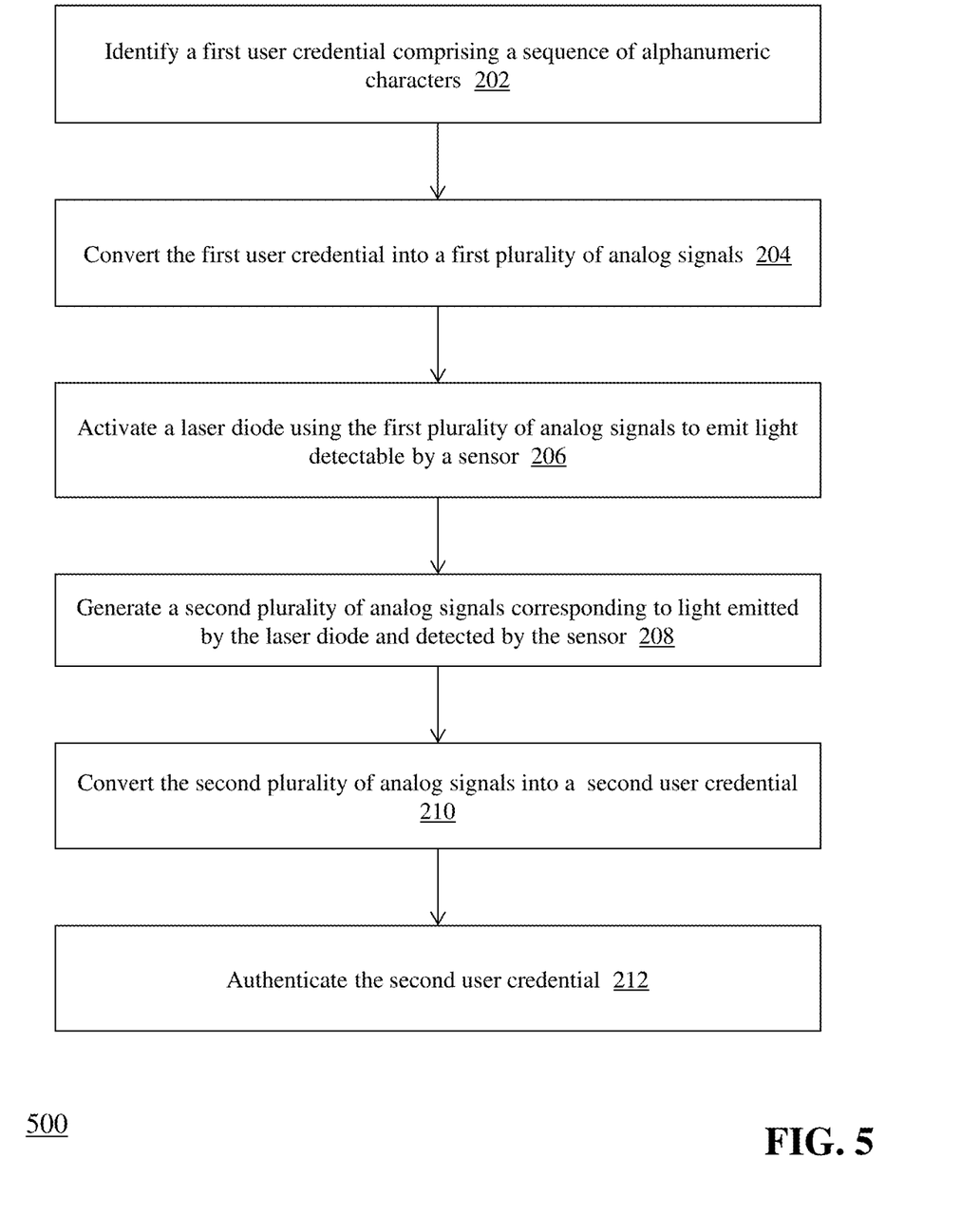
FIG. 5 is a flow diagram of a computerized method of secure transmission and authentication of a user credential.

FIG. 5 is a flow diagram of a computerized method 500 of secure transmission and authentication of a user credential, using system 400 of FIG. 4. It should be appreciated that at least some of the steps described in FIG. 5 comprise the same or similar processing functions and actions as described above with respect to FIG. 2 and the particular details above will not be repeated here.

CPU 403a of computing device 402 measures (step 402) a first illuminance value of ambient light in an enclosure, using ambient light sensor 407. For example, CPU 403a can instruct ambient light sensor 407 to measure the ambient light in housing 416 and transmit one or more signals comprising, e.g., an illuminance value of the ambient light measurement to CPU 403a. The illuminance value can be stored in memory 403b.

Credential conversion module 404a of computing device 402 converts (step 504) a first user credential (e.g., comprising a sequence of alphanumeric characters) and the illuminance value measured by ambient light sensor 407 into a plurality of analog signals. In some embodiments, credential conversion module 404a generates an analog signal for each character in the sequence of alphanumeric characters that make up the first user credential and an analog signal for each numeric value that makes up the illuminance value, and the generated analog signals are then used to activate the laser diode 406. For example, credential conversion module 404a extracts each character from the sequence of alphanumeric characters, and each numeric value from the illuminance value, and converts each of the characters/numeric values to an analog signal that corresponds to a color value and an intensity value of light to be emitted by the laser diode 406. For example, credential conversion module 404a can determine a certain light color and intensity value that is assigned to a particular character (e.g., lowercase letter, uppercase letter, number, etc.) and instruct the laser diode control module 404b to generate an analog wave signal based upon the light color and intensity value. The laser diode control module 404b transmits the analog wave signal to the laser diode 406, which produces one or more pulses of laser light in a color and intensity that correspond to the analog wave signal for the character/numeric value. In some embodiments, the illuminance value can be a decimal value (e.g., 0.0025)—in order to convey the decimal point, credential conversion module 404a can convert the decimal point to an analog signal that is unique to that specific character. Also, in some embodiments, credential conversion module 404a can insert a separation character or delimiter between the user credential and the illuminance value such that the delimiter is also converted to an analog signal. In this way, when the analog signal is detected by sensor 414 and transmitted to signal conversion module 412a, computing device 408 is able to use the presence of the analog signal for the delimiter to differentiate between the portion of the analog signals corresponding to the user credential and the portion of the analog signals corresponding to the illuminance value measured by the ambient light sensor 407.

Once the analog signals for the user credential and the measured illuminance value are generated by the credential conversion module 404a, laser diode control module 404b activates (step 506) the laser diode 406 using the generated analog signals to emit light detectable by the emitted light sensor 414 that is coupled to second computing device 408. Signal conversion module 412a generates (step 508) a second plurality of analog signals corresponding to the light detected by the emitted light sensor 414. In some embodiments, signal conversion module 412a receives the analog signal from the sensor 414 and converts the analog signal into a color value of the light and an intensity value of the light. For example, when the analog signal detected by the sensor 414 falls between a certain range or set of threshold values, signal conversion module 412a can be configured to interpret the signal as a particular alphanumeric character, symbol, delimiter, decimal point, etc. For each different emitted light pulse detected by the sensor 414, signal conversion module 412a converts (step 510) a first portion of the corresponding analog signals received from the sensor 414 into one or more alphanumeric characters that are appended to a second user credential. In some embodiments, the second user credential generated by signal conversion module 412a corresponds to the encrypted or unencrypted first user credential at first computing device 402. In other embodiments, the second user credential can be different than the first user credential (e.g., characters in a different order or an entirely new credential, based upon the laser light received at the sensor 414). Signal conversion module 412a transmits the generated second user credential to credential encryption module 412b, and module 412b authenticates (step 512) the second user credential.

Then, signal conversion module 412a converts (step 514) a second portion of the corresponding analog signals received from the sensor 414 into the illuminance value that was measured by the ambient light sensor 407 in step 402. As mentioned above, signal conversion module 412a can determine that a portion of the analog signals corresponds to the illuminance value based upon, e.g., the presence of one or more analog signals that correspond to a delimiter character or value. Signal conversion module 412a transmits the received illuminance value to CPU 410a of computing device 408.

CPU 410a measures (step 516) a second illuminance value of ambient light in the housing 416, using ambient light sensor 415. For example, CPU 410a can instruct ambient light sensor 415 to measure the ambient light in housing 416 and transmit one or more signals comprising, e.g., an illuminance value of the ambient light measurement to CPU 410a. The illuminance value can be stored in memory 410b. CPU 410a then compares (step 518) the first illuminance value (as received in the analog signals transmitted by the laser diode 406 of computing device 402) to the second illuminance value as measured by ambient light sensor 415 to determine whether the illuminance values match. As can be appreciated, CPU 410a compares the illuminance value captured by sensor 407 prior to transmission of the laser signals and the illuminance value captured by sensor 415 after transmission of the laser signals to determine whether the device(s) 402, 408 and/or housing 416 have been tampered with or altered by a third party attempting to intercept the laser signals. The comparison of illuminance values in this fashion beneficially provides for an additional layer of security and authentication for the transmission of laser pulses by validating the physical integrity of the devices 402 and 408 and/or housing 416.

In a circumstance where the illuminance values match, CPU 410*a* can determine that the computing devices 402 and 402 are communicating in the same housing 416 and that the devices and housing have retained their integrity during the transmission of the laser pulses. As a result, CPU 410*a* can proceed with execution of transactions and/or communication of data to remote computing devices using the user credential.

In a circumstance where the illuminance values do not match, CPU 410*a* can determine that, e.g., the computing devices 402 and 408 are not communicating in the same single housing 416 and/or that the housing 416 was removed or damaged in a way that materially changed the level of ambient light in the housing 416 either during or after transmission of the laser pulses. These conditions can indicate that the user credentials are not secure. As such, CPU 410*a* can prevent execution of any transactions or communications with one or more remote computing devices.

It should be appreciated that, in some embodiments, the illuminance values do not need to match exactly but instead CPU 410*a* can utilize a tolerance range when comparing the illuminance values. For example, if the second illuminance value as measured by ambient light sensor 415 is within an acceptable tolerance of the first illuminance value as measured by ambient light sensor 407, CPU 410*a* can determine that the illuminance values match. This procedure may be beneficial in circumstances where different models or configurations of ambient light sensors are used between the devices 402 and 408.

The above-described techniques can be implemented in electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the technology described herein by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for secure transmission and authentication of a user credential, the system comprising:
   a first computing device comprising a memory and a processor, the first computing device coupled to a laser diode and a first ambient light sensor within an enclosure;
   a second computing device comprising a memory and a processor, the second computing device coupled to an emitted light sensor and a second ambient light sensor within the enclosure;
   wherein the first computing device:
      measures, using the first ambient light sensor, a first illuminance value of ambient light in the enclosure;
      converts a first user credential comprising a sequence of alphanumeric characters and the first illuminance value into a first plurality of analog signals; and
      activates the laser diode using the first plurality of analog signals to emit light detectable by the emitted light sensor; and
   wherein the second computing device:
      generates a second plurality of analog signals corresponding to light emitted by the laser diode and detected by the emitted light sensor;
      converts a first portion of the second plurality of analog signals into a second user credential;
      authenticates the second user credential;
      converts a second portion of the second plurality of analog signals into the first illuminance value;
      measures, using the second ambient light sensor, a second illuminance value of ambient light in the enclosure; and
      compares the first illuminance value and the second illuminance value to determine whether the illuminance values match.

2. The system of claim 1, wherein converting the user credential into a first plurality of analog signals comprises:
   generating an analog signal for activating the laser diode for each character in the sequence of characters;
   generating an analog signal for activating the laser diode for the first illuminance value; and
   transmitting the generated analog signals to the laser diode.

3. The system of claim 2, wherein the analog signals for activating the laser diode each comprises a color value and an intensity value.

4. The system of claim 3, wherein activating the laser diode using the first plurality of analog signals to transmit light to the emitted light sensor comprises:
   emitting, by the laser diode, one or more light pulses corresponding to each analog signal in the first plurality of signals, wherein the one or more light pulses have a color corresponding to the color value of the analog signal and an intensity corresponding to the intensity value of the analog signal.

5. The system of claim 4, wherein the laser diode stops emitting light for a predetermined amount of time between each generation of one or more light pulses corresponding to the first plurality of analog signals.

6. The system of claim 5, wherein the laser diode stops emitting light after all of the light pulses corresponding to the analog signals in the first plurality of signals have been emitted.

7. The system of claim 1, wherein generating a second plurality of analog signals corresponding to light emitted from the laser diode and detected by the emitted light sensor comprises:
   detecting, by the emitted light sensor, light emitted by the laser diode at each of a plurality of intervals;
   converting the light detected at each interval into a color value of the light and an intensity value of the light; and
   generating the first portion of the second plurality of analog signals and the second portion of the second plurality of analog signals based upon the color value and the intensity value of the light detected at each interval.

8. The system of claim 7, wherein converting the first portion of the second plurality of analog signals into a second user credential comprises:
   identifying an alphanumeric character based upon the analog signal generated for each interval in the first portion of the second plurality of analog signals; and
   generating the second user credential based upon the alphanumeric characters.

9. The system of claim 8, wherein authenticating the second user credential comprises encrypting the second user credential and transmitting the encrypted second user credential to a remote computing device for authentication.

10. The system of claim 1, wherein the first user credential is encrypted prior to being converted into the first plurality of analog signals.

11. The system of claim 1, wherein the first ambient light sensor and the second ambient light sensor each comprises a photodiode.

12. The system of claim 1, wherein the second computing device initiates a transaction with a remote computing device when the first illuminance value matches the second illuminance value.

13. The system of claim 1, wherein the second computing device prevents initiation of a transaction with a remote computing device when the first illuminance value does not match the second illuminance value.

14. A computerized method of secure transmission and authentication of a user credential, the method comprising:
    measuring, by a first computing device using a first ambient light sensor in an enclosure, a first illuminance value of ambient light in the enclosure;
    converting, by the first computing device, a first user credential comprising a sequence of alphanumeric characters and the first illuminance value into a first plurality of analog signals; and
    activating, by the first computing device, a laser diode coupled to the first computing device, using the first plurality of analog signals, to emit light detectable by an emitted light sensor coupled to a second computing device, the laser diode and the emitted light sensor each located in the enclosure;
    generating, by the second computing device, a second plurality of analog signals corresponding to light emitted by the laser diode and detected by the emitted light sensor;
    converting, by the second computing device, a first portion of the second plurality of analog signals into a second user credential;
    authenticating, by the second computing device, the second user credential;
    converting, by the second computing device, a second portion of the second plurality of analog signals into the first illuminance value;
    measuring, by the second computing device using a second ambient light sensor in the enclosure, a second illuminance value of ambient light in the enclosure; and
    comparing, by the second computing device, the first illuminance value and the second illuminance value to determine whether the illuminance values match.

15. The method of claim 14, wherein converting the user credential into a first plurality of analog signals comprises:
    generating an analog signal for activating the laser diode for each character in the sequence of characters;
    generating an analog signal for activating the laser diode for the first illuminance value; and
    transmitting the generated analog signals to the laser diode.

16. The method of claim 15, wherein the analog signals for activating the laser diode each comprises a color value and an intensity value.

17. The method of claim 16, wherein activating the laser diode using the first plurality of analog signals to transmit light to the sensor of the second computing device comprises:
    emitting, by the laser diode, one or more light pulses corresponding to each analog signal in the first plurality of analog signals, wherein the one or more light pulses have a color corresponding to the color value of the analog signal and an intensity corresponding to the intensity value of the analog signal.

18. The method of claim 17, wherein the laser diode stops emitting light for a predetermined amount of time between each generation of one or more light pulses corresponding to the first plurality of analog signals.

19. The method of claim 18, wherein the laser diode stops emitting light after all of the light pulses corresponding to the analog signals in the first plurality of analog signals have been emitted.

20. The method of claim 14, wherein generating a second plurality of analog signals corresponding to light emitted from the laser diode and detected by the emitted light sensor comprises:
    detecting, by the emitted light sensor, light emitted by the laser diode at each of a plurality of intervals; and
    converting the light detected at each interval into a color value of the light and an intensity value of the light; and
    generating the first portion of the second plurality of analog signals and the second portion of the second plurality of analog signals corresponding to the color value and the intensity value of the light detected at each interval.

21. The method of claim 20, wherein converting the first portion of second plurality of analog signals into a second user credential comprises:
    identifying an alphanumeric character based upon the analog signal generated for each interval in the first portion of the second plurality of analog signals; and
    generating the second user credential based upon the alphanumeric characters.

22. The method of claim 21, wherein authenticating the second user credential comprises encrypting the second user credential and transmitting the encrypted second user credential to a remote computing device for authentication.

23. The method of claim 14, wherein the first user credential is encrypted prior to being converted into the first plurality of analog signals.

24. The method of claim 14, wherein the first ambient light sensor and the second ambient light sensor each comprises a photodiode.

25. The method of claim 14, wherein the second computing device initiates a transaction with a remote computing device when the first illuminance value matches the second illuminance value.

26. The method of claim 14, wherein the second computing device prevents initiation of a transaction with a remote computing device when the first illuminance value does not match the second illuminance value.

* * * * *